United States Patent
Cabeza et al.

(10) Patent No.: US 6,229,654 B1
(45) Date of Patent: May 8, 2001

(54) ARTICLE WITH RADIAL REFRACTIVE INDEX GRADIENT AND PROCESS FOR ITS MANUFACTURE

(75) Inventors: Stéphane Cabeza, Tokyo (JP); Didier Grand-Clement, Vincennes (FR); Yasuhiro Koike, 534-23, Ichigao-cho, Aoba-ku, Yokohama-Shi, Kanagawa 225 (JP)

(73) Assignees: Essilor International Compagnie Generale d'Optique, Charenton Cedex (FR); Yasuhiro Koike, Kanagawa (JP)

(*) Notice: Subject to any disclaimer, the term of this patent is extended or adjusted under 35 U.S.C. 154(b) by 0 days.

(21) Appl. No.: 09/415,040

(22) Filed: Oct. 7, 1999

Related U.S. Application Data

(63) Continuation of application No. PCT/FR98/00621, filed on Mar. 26, 1998.

(30) Foreign Application Priority Data

Apr. 10, 1997 (FR) .................................................... 97 04427

(51) Int. Cl.⁷ ....................................................... G02B 3/00
(52) U.S. Cl. ............................. 359/652; 359/653; 359/654
(58) Field of Search ..................................... 359/652–655

(56) References Cited

U.S. PATENT DOCUMENTS

| | | | |
|---|---|---|---|
| 4,022,855 | 5/1977 | Hamblen | 264/1 |
| 5,095,079 | 3/1992 | Yean et al. | 526/60 |
| 5,258,144 | 11/1993 | Yean et al. | 264/1.7 |
| 5,807,906 | 9/1998 | Bonvallot et al. | 522/182 |

FOREIGN PATENT DOCUMENTS

| | | |
|---|---|---|
| 0 130 838 | 1/1985 | (EP) . |
| 0407294 | 5/1993 | (EP) . |
| 0504011 | 6/1995 | (EP) . |
| 2731081 | 4/1997 | (FR) . |
| 1362757 | 8/1974 | (GB) . |
| 60-162611 | 8/1985 | (JP) . |
| 61-206631 | 9/1986 | (JP) . |

*Primary Examiner*—Georgia Epps
*Assistant Examiner*—Evelyn A. Lester
(74) *Attorney, Agent, or Firm*—Fulbright & Jaworski L.L.P.

(57) ABSTRACT

The transparent article with radial gradient index, according to the invention, comprises a matrix made of a first transparent polymer having a first refractive index $n_1$ and a first Abbe number $v_1$, a second transparent polymer, diffused into the first polymer in order to produce the radial gradient index and having a second refractive index $n_2$, different than the first refractive index, and a second Abbe number $v_2$, characterized in that it furthermore comprises an effective amount of an Abbe number modifier agent which reduces by at least 10%, preferably by at least 15%, and more preferably by at least 20%, the value of the Abbe number of that of the first or second polymer which has the refractive index with lower value.

26 Claims, 1 Drawing Sheet

ARTICLE WITH RADIAL REFRACTIVE INDEX GRADIENT AND PROCESS FOR ITS MANUFACTURE

Figure 1:
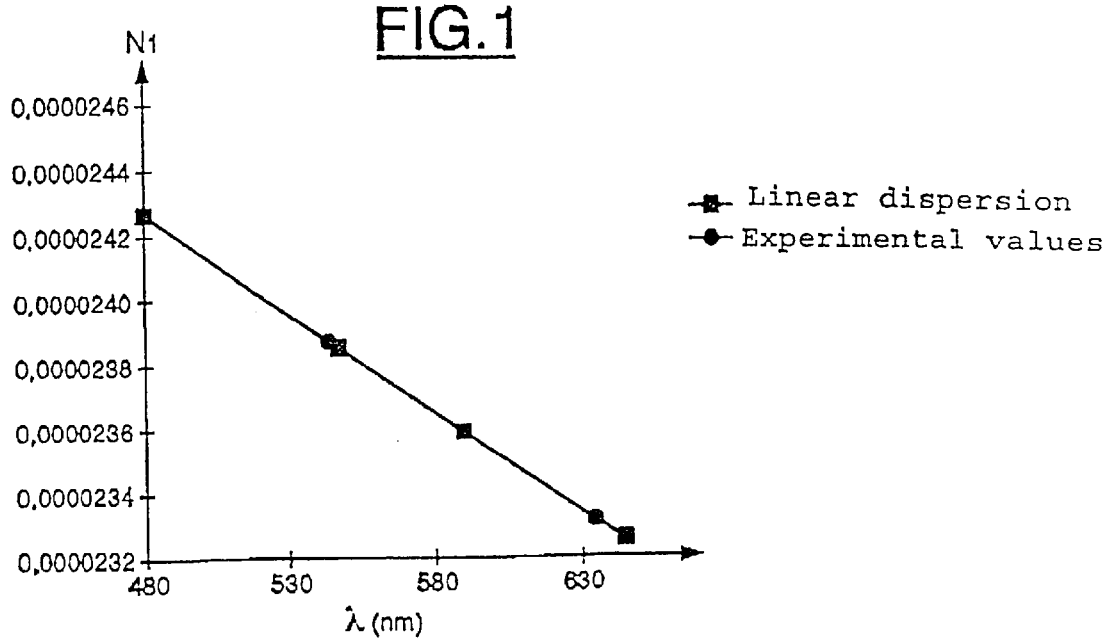

This application is a continuation of international application number PCT/FR98/00621 filed Mar. 26, 1998, which is a continuation of French Application No. 97/04427 filed Apr. 10, 1997.

The present invention relates in general to (GRIN, graded-index) transparent articles with radial gradient refractive-index, for example optical lenses and optical fibers, and more particularly transparent articles of this type which have little chromatic aberration.

An optical article is characterized by its geometry, its thickness and its refractive index, the latter often being uniform. A gradient refractive index in an optical material provides an additional degree of freedom regarding the use of the article. This is because the gradient index makes it possible to vary the optical path of the rays independently of the geometry of the article.

Distinction is generally made between four types of gradient refractive index, each depending on the symmetry present in the article.

- axial gradient index: the index varies along a given axial direction of the article; it is uniform in any plane perpendicular to this direction;
- radial gradient index: the index varies as a function of the distance from a given axis; it is uniform on any cylindrical surface of given radius having the same axis as the gradient. If the index decreases from the center of the article toward the periphery (positive GRIN), a positive lens effect (convergence) is obtained. Conversely, if the index increases from the center of the article toward the periphery (negative GRIN), a negative lens effect (divergence) is obtained;
- spherical gradient index: the index varies as a function of the distance from a given point; the surfaces of equal index are spherical.

Invariant index through a translatory motion, i.e. the index varies in a plane surface perpendicular to a defined axial direction of the article.

An optical equivalence has been demonstrated between a plano-convex (or plano-concave) lens with uniform index and a lens with radial parabolic gradient index, the index of which decreases from the center toward the edge (or from the edge toward the center).

In particular, the purpose of producing optical articles with a gradient refractive-index is to design simpler optical systems with performance equal to that obtained with systems consisting of optical elements having a uniform index. For example, production of this type makes it possible to manufacture multi-element optical systems in which the number of elements would thus be reduced, or to produce corrective glasses or lenses which are less thick and/or have a simpler geometry.

Furthermore, optical articles with a radial or spherical gradient index offer many applications in optoelectronics or in telecommunications when the index distribution is quasi-parabolic or parabolic. Very short-distance light focusing properties are obtained, which are highly desired in photocopiers, laser disk drives and players or optical fibers.

Gradient-index lenses and their manufacturing processes are described, amongst other things, in documents EP-0,407,294, EP-0,504,011 and FR-9,502,266.

A process for manufacturing optical fibers with a radial index gradient is described in the article by Oktsuka Koike (Applied Optics, 24 (24), pages 4316 to 4320 (1985)).

In what is following, we will focus particularly on articles having a gradient index obtained by radial diffusion of a monomer precursor of a polymer 2 (refractive index $n_2$, Abbe number $v_2$) in a polymer matrix 1 (refractive index $n_1$, Abbe number $v_1$).

The chromatism of a transparent article is linked not only to the geometry of the article but also to the fact that the refractive index of a transparent material varies as a function of the wavelength of the light which passes through it.

In general, the refractive index n of a transparent material increases when the wavelength of the light decreases, that is to say the refractive index of the material is higher for blue than for red.

In general, the measure of the light-dispersion properties of a homogeneous thin lens satisfies the equation:

$$\frac{\delta f}{f} + \frac{\delta n}{n-1} = 0 \qquad (1)$$

where f is the focal length, n is the refractive index, and

δn is the difference in refractive index between 2 wavelengths of light.

The term $$\frac{\delta n}{n-1}$$

is referred to as the dispersion factor and is related to the inverse of the Abbe number $v_D$.

Classically, this Abbe number is evaluated using refractive index of the material for different wavelengths, by the equation $$\frac{1}{v_D} = \frac{n_F - n_C}{n_D - 1}$$

where $n_F$ is the refractive index of the material for light with wavelength λ=486 nm (blue)

$n_C$ is the refractive index of the material for light with wavelength λ=656 nm (red)

$n_D$ is the refractive index of the material for sodium D line.

Furthermore, the power of a gradient-index transparent article depends partly on the geometrical shape of the article as in a homogeneous lens (Ph) and partly on the gradient index (PGrin), that is to say P total=$P_H$+$P_{GRIN}$ An Abbe number can therefore be defined which characterizes the chromatism of the power linked with the gradient index, and the total chromatism of the article is the sum of the two contributions:

$$\text{axial chromatism} \simeq \frac{P_H}{v_D} + \frac{P_{GRIN}}{v_{GRIN}}$$

The longitudinal paraxial chromatic aberration (PAC) of a lens is defined by the equation:

$$PAC = \frac{h^2}{u'}\left(\frac{Ph}{v_A} + \frac{P_{GRIN}}{v_{GRIN}}\right) \quad (2)$$

where h is the height of the marginal paraxial ray, u' is the exit angle of the paraxial ray, $P_H$ is the power of a homogeneous lens with refractive index $n_{DA}$, $n_{DA}$ is the refractive index for Dline at the center of the lens, $v_A$ is the Abbe number related to index $n_{DA}$, $P_{GRIN}$ is the power of the gradient index of the lens, and $v_{GRIN}$ is the Abbe number of the GRIN lens.

From equation (2) it follows that reducing the value of the factor $$\frac{P_{GRIN}}{v_{GRIN}}$$

reduces the PAC value.

In the case of a lens with a quasi parabolic type radial gradient index, the refractive index as a function of the radius of the lens can be expanded as a polynomial:

$$n_\lambda(r) = n_{1\lambda} + N_{1\lambda}r^2 + N_{2\lambda}r^4 + \ldots$$

where r is the radius of the lens $n_\lambda(r)$ is the refractive index as a function of the radius at a particular wavelength $n_1$ is the refractive index at r=0 i.e. on the optical axis of the lens.

For reasons of simplifications, we consider that $n_{1\lambda}$ is the refractive index at the particular wavelength of the transparent polymer constituting the matrix, that is to say $n_{1\lambda} = n_{DA}$ in the previous formula (2).

$N_{i\lambda}$ are constants which describe the gradient index at the particular wavelength.

In the case of paraxial rays, that is to say ones which make a small angle, generally $\leq 15°$ with respect to the axis of the lens, it is possible, as an approximation, to consider the gradient index as parabolic and express the refractive index as a function of radius by the equation:

$$n_\lambda(r) = n_{1\lambda} + N_{1\lambda}r^2 \quad (3)$$

i.e. for F line $n_F(r) = n_{1f} + N_{1F}r^2$ (3')

for C line $n_C(r) = n_{1C} + N_{1C}r^2$ (3")

for D line $n_D(r) = n_{1D} + N_{1D}r^2$ (3''')

In the paraxial range and for a lens having a thickness e, the power of the gradient index is expressed by the equation:

$$P_{GRIN} = -2N_{1D}e \quad (4)$$

It is deduced from equations (1) and (4) that $$\frac{\delta f}{f} = \frac{\delta N_1}{N_{1D}} = \frac{N_{1F} - N_{1C}}{N_{1D}} = \frac{1}{v_{GRIN}} \quad (5)$$

where $N_{1F}$, $N_{1C}$ and $N_{1D}$ are the constant factor of $r^2$ in equations 3', 3", 3'''.

The GRIN Abbe number is deduced by combining equations (3), (3'), (3"), (3''') and equation (5) and assuming that the concentration of the material 2 (material diffused into the material 1 of the matrix) is 100% at the maximum radius, that is to say at the radial extremity of the lens, the Abbe number of the gradient index can be expressed by the equation:

$$v_{GRIN} = \frac{(n_{2D} - n_{1D})v_1 v_2}{(n_{2D} - 1)v_1 - (n_{1D} - 1)v_2} \quad (6)$$

where $n_{1D}$ is the refractive index of the material 1 for the sodium D line and $v_1$ is the Abbe number of material 1

$n_{2D}$ is the refractive index of the material 2 for the sodium D line and $v_2$ is the Abbe number of material 2.

As indicated above, in order to decrease the chromatism due to the GRIN contribution value (equation (2)), it is desired to reduce the value of the factor $$\frac{P_{GRIN}}{v_{GRIN}}$$

and therefore to increase the value of the Abbe number $v_{GRIN}$ of the gradient index.

$v_{GRIN}$ is a maximum when the factor $(n_{2D}-1)v_1 - (n_{1D}-1)v_2 \rightarrow 0$, i.e.

$$v_1 \rightarrow \frac{v_2(n_{1D} - 1)}{(n_{2D} - 1)} \quad (7)$$

As regards the chromatic properties of gradient-index transparent articles, reference may usefully be made to the article "Model for the chromatic properties of gradient-index glass" by Danette P. Ryan-Howard and Duncan T. Moore, Applied Optics/Vol. 24, No. 24/15 December 1985 and to document U.S. Pat. No. 5,361,166.

In the case of a lens with a negative gradient index, that is to say a lens whose refractive index increases from the center of the lens to its periphery, a material with a higher refractive index than the material of the matrix must diffuse into the material forming the matrix of the lens. Of course, in order to obtain a positive gradient the opposite must be performed, that is to say diffusing a material with low refractive index into a material with high refractive index.

Materials with high refractive index generally have a lower Abbe number than materials with lower index.

In order to increase $V_{GRIN}$ in equation (7), a first solution would consist in using pairs of high-index and low-index materials in which the material with high refractive index has a high Abbe number and the low-index material has a low Abbe number.

High-index materials with high Abbe number are rare, generally difficult to obtain and expensive. The same is true for low-index materials with low Abbe number.

Another solution would consist in modifying (reducing) the Abbe number of the low-index material by incorporating a modifier agent without significantly impairing, that is to say without notably increasing, the refractive index of the low-index material.

In general, materials with high refractive index have a refractive index $\geq 1.56$ and materials with low refractive index have a refractive index $\leq 1.53$.

The object of the present invention is therefore to produce a transparent article with radial gradient index having reduced longitudinal paraxial chromatic aberration.

A further object of the invention is a process for manufacturing an article of this type.

According to the invention, a transparent article with radial index gradient is produced, comprising a matrix made of a first transparent polymer having a first refractive index $n_1$ and a first Abbe number v1, a second transparent polymer, diffused into the first polymer in order to produce the radial gradient index and having a second refractive index $n_2$, different than the first index, and a second Abbe number $v_2$, and an effective amount of an Abbe number modifier agent which reduces by at least 10%, preferably by at least 15%, and more preferably by at least 20%, the value of the Abbe number of that of the first or second polymer which has the refractive index with lower value.

Preferably, the Abbe number modifier agent has a low Abbe number and a refractive index as low as possible in order to avoid notably increasing the refractive index of the low index material.

As materials having a low Abbe number have generally high refractive index, in practice, the available modifier agents having an Abbe number equal or below 30 have a refractive index comprised between 1.6–1.7.

The Abbe number modifier agent results in a relative higher decrease of the Abbe number of the low refractive index material compared to the relative increase of the refractive index of the same material.

In general, up to 30% by weight, preferably 10 to 25% by weight, of Abbe number modifier agent may be used relative to the total weight of the material with lower refractive index.

There are two types of Abbe number modifier agents used in the present invention, reactive agents and nonreactive agents.

The reactive agents are compounds which react with the precursor compound or compounds of the material with lower refractive index, whereas the nonreactive agents are compounds, generally aromatic, which do not react with the precursor compound or compounds of the material with lower refractive index.

Abbe number modifier agents according to the present invention are indicated in the table below.

| Abbe number modifier agent | Refractive index | Abbe number |
|---|---|---|
| Reactant | | |
| Pentachlorophenyl methacrylate | 1,608 | 22,5 |
| o-Chlorostyrene | 1,6018 | 21 |
| p-Divinylbenzene | 1,615 | 20 |
| N-vinylphthalimide | 1,62 | 24,1 |
| 2-Naphthyl methacrylate | 1,6298 | 24 |
| 1-Naphthylcarbinyl methacrylate | 1,63 | 25 |
| Fluorenyl methacrylate | 1,6319 | 23,1 |
| Vinylthiophene | 1,6376 | 29 |
| 1-Naphthyl methacrylate | 1,6411 | 20,5 |
| Lead dimethacrylate | 1,645 | 28 |
| Vinylnaphthalene | 1,6818 | 20,9 |
| Vinylcarbazole | 1,683 | 18,8 |
| Nonreactive | | |
| Dibenzofuran | — | — |
| Benzalacetophenone | — | — |
| Naphthalene | — | — |
| Benzalazine | — | — |
| Benzoic anhydride | — | — |
| Dibenzophenone | — | — |

For the nonreactive modifier agents, it is not possible to measure directly the refractive index and the Abbe number of these compounds, but the refractive index and the Abbe number of mixtures of polymethyl methacrylate (PMMA) initially having a refractive index $n_D$=1.492 and an Abbe number $V_D$=55 with the various nonreactive agents were determined. The results are indicated in the table below.

| Benza-laceto-phenone | Abbe number Benza-lazine | modifier Benzoic anhydride | agent Dibenzo-phenone | Dibenzo-furan | Naph-thalene | PMMA | n | v |
|---|---|---|---|---|---|---|---|---|
| 5g | — | — | — | — | — | 100 g | 1.501 | 45 |
| — | 4.2 g | — | — | — | — | 100 g | 1.5004 | 45 |
| — | — | 11 g | — | — | — | 100 g | 1.5034 | 47 |
| — | — | — | 5g | — | — | 100 g | 1.4984 | 47,6 |
| — | — | — | — | 12.5 g | — | 100 g | 1.51 | 36 |
| — | — | — | — | — | 16.66 g | 100 g | 1.51 | 42 |

As indicated above, the matrix of the article with radial gradient index may consist of a low-index transparent polymer, and the gradient index may be obtained by diffusion and polymerization in the matrix of a high-index polymerizable material, or vice versa.

The transparent polymers with low refractive index which can be used in the present invention are preferably polymers resulting from the polymerization of monofunctional monomers such as alkyl (meth)acrylates and haloalkyl (meth) acrylates such as fluoroalkyl (meth)acrylates. Alkyl methacrylates and fluoroalkyl methacrylates such as methyl methacrylate, butyl methacrylate and trifluoromethyl methacrylate are particularly recommended.

Among the high-index transparent polymers which can be used in the present invention, mention maybe made of polystyrene, poly(acryl or halogenated aryl (meth)

acrylates), polymers obtained from sulfur containing poly(meth)acrylate, (meth)acrylate esters of polythiols, selenium containing monomers. The recommended high-index transparent polymers are polystyrene, poly(benzyl methacrylate) and poly(chlorobenzyl methacrylate), polymer from bis-[(2-methacryloylthio)ethyl] sulfide.

The preferred high index polymers have an Abbe number of 35 or more.

Also preferably, the matrix consists of a low-index transparent polymer resulting from the polymerization of monofunctional monomers, because using monomers of this type facilitates the diffusion of the precursor monomers of the gradient-index polymer.

The present invention also relates to a process for manufacturing a transparent article with radial gradient index, which consists in:

(a) making a mixture of an effective amount of an Abbe number modifier agent and precursor monomers of a first transparent polymer having a first refractive index and a first Abbe number, the Abbe number modifier agent reducing the Abbe number of the first transparent polymer by at least 10%;

(b) obtaining a predetermined amount of precursor monomers of a second transparent polymer having a second refractive index, greater than the first refractive index, and a second Abbe number;

(c) placing either the product resulting from step (a) or the product resulting from step (b) between the parts of a two-part mold;

(d) partially polymerizing the product arranged in the mold in order to obtain a gel;

(e) diffusing the remaining one of the products obtained in step (a) or step (b) into the gel obtained in step (d); and (f) completing the polymerization in order to obtain the transparent article with radial gradient index.

Preferably, the partial polymerization in step (d) and the final polymerization in step (f) are photopolymerizations, and at least that of the products of step (a) or step (b) which is gelled in step (b) furthermore comprises a photopolymerization initiator.

Any photoinitiator known for the photopolymerization of (meth)acrylate monomers may be used. Among the photopolymerization initiators which can be used in the process of the present invention, the following may be mentioned:

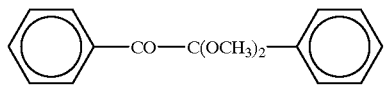
(Irgacure® 651)

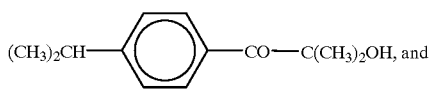
(Darocur® 1116)

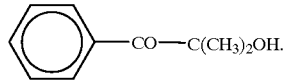
(Darocur® 1173)

The products of steps (a) and (b) of the process preferably also comprise a crosslinking agent in the usual proportions. Among the crosslinking agents which can be used in the present invention, mention may be made of poly(meth)acrylate monomers such as pentaerythritol triacrylate, trimethylolpropane triacrylate, tripropylene glycol diacrylate, 1,6-hexanediol diacrylate, ethylene glycol di(meth)acrylate and polyethylene glycol di(meth)acrylates.

Preferably, the product of step (a) of the process, that is to say the mixture of the Abbe number modifier agent, of the precursor monomers of the low-index polymer, of a crosslinking agent and of a photopolymerization initiator, is arranged in the mold at step (c) and partially photopolymerized to form a gel. Precursor monomers of the high-index polymer are then diffused into the gel before completing the photopolymerization.

The following examples illustrate the present invention, but without limiting it. In the examples, except where otherwise indicated, all the percentages and proportions are expressed by weight.

EXAMPLE 1

Comparative Example A

A photopolymerizable mixture comprising 90% by weight of methyl methacrylate and 10% by weight of polyethylene glycol 400 dimethacrylate is made. 0.1% by weight of Darocur® 1173 is added to this mixture. 15% by weight of naphthalene is added as an Abbe number modifier agent to this mixture of low-index polymer precursors. The mixture obtained is arranged in a two-part plano glass mold and prepolymerized to form a gel by irradiation for 25 minutes using a Hand UV lamp ($\lambda$=320–400 nm) arranged at a distance of 15 cm, which corresponds to a power of 0.7 mW/cm2. Once the gel has been obtained, the lateral seal of the mold is withdrawn and the gel contained between the two parts of the mold is immersed in benzyl methacrylate (precursor of the high-index polymer; poly(benzyl methacrylate) has a refractive index of 1.568 and an Abbe number of 38) and the benzyl methacrylate is diffused into the gel at 30° C. for 48 hours.

The index profiles of the resulting gel-form product is obtained using the fringe deflectometry apparatus and process from Patent Application FR-95 09411 for the wavelengths $\lambda$=543.5 nm and $\lambda$=632.8 nm. The measured profiles are then developed in the form of a polynomial ($\Delta = N_{1\lambda} r^2$) and $V_{GRIN}$ "LINEAR" is calculated by determining the coefficients $N_1$ at the wavelengths $\lambda$=480 nm, $\lambda$=546.1 nm, $\lambda$=589.3 nm, $\lambda$=643.8 nm using a least-squares approximation method. $v_{GRIN}$ "THEORETICAL" is determined on the basis of refractive indices and the Abbe number of the starting materials. The indices and Abbe numbers of the various constituents were measured by a refractometer for the F, C and D lines By way of comparison (Comparative Example A), a gelled product similar to the above product, but not containing naphthalene, is produced as before, $v_{GRIN}$ "THEORETICAL" and $v_{GRIN}$ "LINEAR" are determined in similar fashion.

The results are indicated in the table below.

|  | Power$_{GRIN}$ (dioptries) | $v_{GRIN}$ "THEORETICAL" | $v_{GRIN}$ "LINEAR" |
| --- | --- | --- | --- |
| Example 1 | −0.25 | 23 | 25 |
| Comparative Example A | −0.33 | 14 | 17 |

Although the theoretical values of the Abbe numbers and those determined experimentally are different, the experimental results keep the order of magnitude of the theoretically determined increase in the Abbe number.

Figure 2:
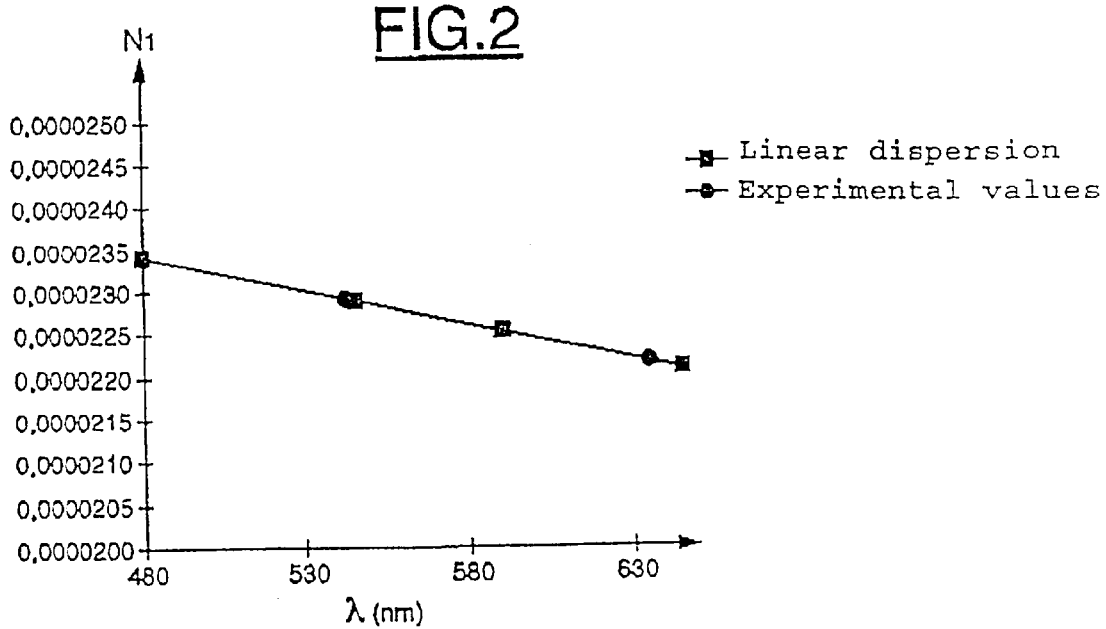

FIGS. 1 and 2 represent the variations in $N_1$ as a function of wavelength for the products of Example 1 and of Comparative Example A, respectively.

Using naphthalene as an Abbe number modifier agent increases $V_{GRIN}$ by at least 40% and consequently reduces the PAC number.

The fringe deflectometry apparatus and process used to determine the index profiles are described in French Patent Application FR 95 09411 of Aug. 2, 1995.

In brief, the apparatus comprises means for illuminating an optical component to be measured with radiation of known wavefront, means for performing deflectometry on the radiation after it has been reflected or transmitted by the optical component to be measured, means for forming a reference ray and means for measuring the transverse aberration of the reference ray after it has been reflected or transmitted by the optical component to be measured.

The deflectometry process employed with the apparatus consists in illuminating an optical component to be measured with radiation of known wavefront and in analyzing the fringes generated in the deflectometry means by the radiation reflected or transmitted by the component. Thus, the reduced phase is measured on the deflectometry means by a ray reflected or transmitted by the component, the transverse aberration of the ray is measured and the absolute phase of the ray is calculated on the deflectometry means on the basis of the measurement of the reduced phase, removing the ambiguity by virtue of the measurement of the transverse aberration.

For determining the index profiles, conventional apparatuses and processes such as described in documents FR-A-2,710,162 and EP-A-0,644,411 may also be used.

EXAMPLES 2 TO 61 AND COMPARATIVE EXAMPLES B TO L

The Abbe numbers, $v_{GRIN}$ "THEORETICAL", are determined theoretically for various polymers with high and low refractive index and various modifier agents.

The results are given in the table below.

| EXAMPLE No. | LOW INDEX MATRIX | HIGH-INDEX POLYMER | | | |
|---|---|---|---|---|---|
| | | Polystyrene $n = 1.592 - v = 30$ | Polybenzyl-methacrylate $n = 1.565 - v = 36.5$ | Poly(o-chlorobenzyl) methacrylate $n = 1.5823 - v = 37$ | Polydi(ethylene sulfide) dithiomethacrylate $n = 1.62 - v = 36$ |
| Comparative Examples B to D | Methylmethacrylate $n = 1.49$ $v = 54$ | $\Delta n = 0.102$ $v_{GRIN} = 9.6$ | $\Delta n = 0.076$ $v_{GRIN} = 12$ | $\Delta n = 0.0923$ $v_{GRIN} = 14$ | $\Delta n = 0.13$ $v_{GRIN} = 16.5$ |
| Examples 2 to 4 | Methylmethacrylate/naphtyl methacrylate (80/20) $n = 1.52; v = 38.5$ | $\Delta n = 0.072$ $v_{GRIN} = 11.6$ | $\Delta n = 0.048$ $v_{GRIN} = 26$ | $\Delta n = 0.0623$ $v_{GRIN} = 28$ | |
| Examples 5 to 7 | Methylmethacrylate/naphtalene (80/20) $n = 1.51; v = 40$ | $\Delta n = 0.082$ $v_{GRIN} = 13$ | $\Delta n = 0.055$ $v_{GRIN} = 23$ | | $\Delta n = 0.11$ $v_{GRIN} = 27.5$ |
| Examples 8 to 10 | Methylmethacrylate/N-vinylcarbazole (85/15) $n = 1.52; v = 38$ | $\Delta n = 0.072$ $v_{GRIN} = 13.3$ | $\Delta n = 0.045$ $v_{GRIN} = 29$ | | $\Delta n = 0.1$ $v_{GRIN} = 32.5$ |
| Examples 11 to 13 | Methylmethacrylate/N-vinylcarbazole (80/20) $n = 1.526; v = 37$ | $\Delta n = 0.066$ $v_{GRIN} = 12$ | $\Delta n = 0.042$ $v_{GRIN} = 37$ | $\Delta n = 0.0563$ $v_{GRIN} = 37$ | |

| EXAMPLE No. | LOW INDEX MATRIX | HIGH-INDEX POLYMER | | | |
|---|---|---|---|---|---|
| | | Polystyrene $n = 1.592 - v = 30$ | Polybenzyl-methacrylate $n = 1.565 - v = 36.5$ | Poly(o-chlorobenzyl) methacrylate $n = 1.5823 - v = 37$ | Polydi(ethylene sulfide) dithiomethacrylate $n = 1.62 - v = 36$ |
| Examples 14 to 16 | Methylmethacrylate/dibenzofuran (85/15) $n = 1.515; v = 39$ | $\Delta n = 0.077$ $v_{GRIN} = 13$ | $\Delta n = 0.05$ $v_{GRIN} = 25$ | | $\Delta n = 0.105$ $v_{GRIN} = 29.5$ |
| Examples 17 to 19 | Methylmethacrylate/dibenzofuran (80/20) $n = 1.515; v = 39.5$ | $\Delta n = 0.077$ $v_{GRIN} = 11.5$ | $\Delta n = 0.053$ $v_{GRIN} = 23$ | $\Delta n = 0.0673$ $v_{GRIN} = 25$ | |
| Examples 20 to 22 | Methylmethacrylate/benzalazine (80/20) $n = 1.5005; v = 45$ | $\Delta n = 0.915$ $v_{GRIN} = 10.6$ | $\Delta n = 0.0675$ $v_{GRIN} = 16$ | $\Delta n = 0.0818$ $v_{GRIN} = 18$ | |

-continued

| EXAMPLE No. | LOW INDEX MATRIX | HIGH-INDEX POLYMER | | | |
|---|---|---|---|---|---|
| | | Polystyrene $n = 1.592 - \nu = 30$ | Polybenzyl-methacrylate $n = 1.565 - \nu = 36.5$ | Poly(o-chlorobenzyl) methacrylate $n = 1.5823 - \nu = 37$ | Polydi(ethylene sulfide) dithiomethacrylate $n = 1.62 - \nu = 36$ |
| Examples 23 to 25 | Methylmethacrylate/benzalazine (90/10) $n = 1.51; \nu = 39$ | $\Delta n = 0.082$ $\nu_{GRIN} = 13.6$ | $\Delta n = 0.055$ $\nu_{GRIN} = 25.5$ | | $\Delta n = 0.11$ $\nu_{GRIN} = 30$ |
| Comparative Examples F to I | N-butylmethacrylate $n = 1.4831; \nu = 48$ | $\Delta n = 0.1089$ $\nu_{GRIN} = 11$ | $\Delta n = 0.0819$ $\nu_{GRIN} = 15$ | $\Delta n = 0.0992$ $\nu_{GRIN} = 16.8$ | $\Delta n = 0.1369$ $\nu_{GRIN} = 20$ |

| EXAMPLE No. | LOW INDEX MATRIX | HIGH-INDEX POLYMER | | | |
|---|---|---|---|---|---|
| | | Polystyrene $n = 1.592 - \nu = 30$ | Polybenzyl-methacrylate $n = 1.565 - \nu = 36.5$ | Poly(o-chlorobenzyl) methacrylate $n = 1.5823 - \nu = 37$ | Polydi(ethylene sulfide) dithiomethacrylate $n = 1.62 - \nu = 36$ |
| Examples 26 to 28 | N-butylmethacrylate/naphtyl methacrylate (80/20) $n = 1.511; \nu = 37.5$ | $\Delta n = 0.081$ $\nu_{GRIN} = 13.4$ | $\Delta n = 0.054$ $\nu_{GRIN} = 34.4$ | $\Delta n = 0.0713$ $\nu_{GRIN} = 35$ | |
| Examples 29 to 31 | N-Butylmethacrylate/naphtalene (80/20) $n = 1.505; \nu = 39$ | $\Delta n = 0.087$ $\nu_{GRIN} = 16$ | $\Delta n = 0.06$ $\nu_{GRIN} = 26.2$ | | $\Delta n = 0.115$ $\nu_{GRIN} = 30$ |
| Examples 32 to 34 | N-butylmethacrylate/ N-vinylcarbazole (85/15) $n = 1.512 \nu = 36.5$ | $\Delta n = 0.08$ $\nu_{GRIN} = 17.7$ | $\Delta n = 0.053$ $\nu_{GRIN} = 43$ | | $\Delta n = 0.108$ $\nu_{GRIN} = 40$ |
| Examples 35 to 37 | N-butylmethacrylate/ N-vinylcarbazole (80/20) $n = 1.52; \nu = 35.5$ | $\Delta n = 0.072$ $\nu_{GRIN} = 14$ | $\Delta n = 0.045$ $\nu_{GRIN} = 72.3$ | $\Delta n = 0.0523$ $\nu_{GRIN} = 57$ | |
| Examples 38 to 40 | N-butylmethacrylate/ dibenzofuran (85/15) $n = 1.501; \nu = 40$ | $\Delta n = 0.091$ $\nu_{GRIN} = 15$ | $\Delta n = 0.064$ $\nu_{GRIN} = 23.7$ | | $\Delta n = 0.119$ $\nu_{GRIN} = 28$ |

| EXAMPLE No. | LOW INDEX MATRIX | HIGH-INDEX POLYMER | | | |
|---|---|---|---|---|---|
| | | Polystyrene $n = 1.592 - \nu = 30$ | Polybenzyl-methacrylate $n = 1.565 - \nu = 36.5$ | Poly(o-chlorobenzyl) methacrylate $n = 1.5823 - \nu = 37$ | Polydi(ethylene sulfide) dithiomethacrylate $n = 1.62 - \nu = 36$ |
| Examples 41 to 43 | N-butylmethacrylate/dibenzofuran (80/20) $n = 1.507; \nu = 38.3$ | $\Delta n = 0.085$ $\nu_{GRIN} = 13$ | $\Delta n = 0.058$ $\nu_{GRIN} = 28.5$ | $\Delta n = 0.0753$ $\nu_{GRIN} = 30$ | |
| Examples 44 to 46 | N-butylmethacrylate/benzalazine (80/20) $n = 1.496; \nu = 41$ | $\Delta n = 0.098$ $\nu_{GRIN} = 12.6$ | $\Delta n = 0.069$ $\nu_{GRIN} = 21.7$ | $\Delta n = 0.0863$ $\nu_{GRIN} = 23.7$ | |
| Examples 47 to 49 | N-butylmethacrylate/ benzalazine (90/10) $n = 1.501 \nu = 40$ | $\Delta n = 0.091$ $\nu_{GRIN} = 16$ | $\Delta n = 0.064$ $\nu_{GRIN} = 23.7$ | | $\Delta n = 0.119$ $\nu_{GRIN} = 30$ |
| Comparative Examples J to L | Trifluro ethylmethacrylate $n = 1.43; \nu = 65$ | $\Delta n = 0.162$ $\nu_{GRIN} = 12.6$ | $\Delta n = 0.135$ $\nu_{GRIN} = 15.3$ | | $\Delta n = 0.019$ $\nu_{GRIN} = 18.4$ |
| Examples 50 to 52 | Trifluoro ethylmethacrylate/ N-vinylcarbazole (85/15) $n = 1.487; \nu = 37$ | $\Delta n = 0.105$ $\nu_{GRIN} = 16.4$ | $\Delta n = 0.078$ $\nu_{GRIN} = 37$ | | $\Delta n = 0.133$ $\nu_{GRIN} = 37$ |

| | | HIGH-INDEX POLYMER | | | |
|---|---|---|---|---|---|
| EXAMPLE No. | LOW INDEX MATRIX ↓ | Polystyrene n = 1.592 - ν = 30 | Polybenzyl-methacrylate n = 1.565 - ν = 36.5 | Poly(o-chlorobenzyl) methacrylate n = 1.5823 - ν = 37 | Polydi(ethylene sulfide) dithiomethacrylate n = 1.62 - ν = 36 |
| Examples 53 to 55 | Trifluoroethylmethacrylate/dibenzofuran (85/15) n = 1.477; ν = 42 | Δn = 0.077 $\nu_{GRIN}$ = 14 | Δn = 0.05 $\nu_{GRIN}$ = 23 | | Δn = 0.105 $\nu_{GRIN}$ = 26.5 |
| Examples 56 to 58 | Trifluoroethylmethacrylate/ naphtalene (80/20) n = 1.476; ν = 40 | Δn = 0.116 $\nu_{GRIN}$ = 14 | Δn = 0.089 $\nu_{GRIN}$ = 26.7 | | Δn = 0.144 $\nu_{GRIN}$ = 29.5 |
| Examples 59 to 61 | Trifluoroethylmethacrylate/ benzalazine (90/10) n = 1.47 ν = 41 | Δn = 0.122 $\nu_{GRIN}$ = 14 | Δn = 0.095 $\nu_{GRIN}$ = 25.2 | | Δn = 0.15 $\nu_{GRIN}$ = 28.5 |

What is claimed is:

1. An article having a radial gradient refractive index comprising a matrix that comprises a first polymer with first refractive index ($n_1$) and first Abbe number ($\nu_1$), a second polymer with second refractive index ($n_2$) and second Abbe number ($\nu_2$), and an Abbe number modifier agent that reduces by at least 10% either the value of $\nu_1$, if $n_1$ is less that $n_2$, or the value of $\nu_2$, if $n_2$ is less than $n_1$, wherein the second polymer is diffused into the first polymer forming the radial gradient index.

2. The article of claim 1, wherein the Abbe number modifier agent reduces by at least 15% either the value of $\nu_1$, if $n_1$ is less that $n_2$, or the value of $\nu_2$, if $n_2$ is less than $n_1$.

3. The article of claim 1, wherein the Abbe number modifier agent reduces by at least 20% either the value of $\nu_1$, if $n_1$ is less that $n_2$, or the value of $\nu_2$, if $n_2$ is less than $n_1$.

4. The article of claim 1, wherein the Abbe number modifier agent has an Abbe number less than or equal to 30.

5. The article of claim 1, further defined as comprising up to 30% by weight Abbe number modifier agent relative to either the weight of the first polymer, if $n_1$ is less that $n_2$, or the weight of the second polymer, if $n_2$ is less than $n_1$.

6. The article of claim 5, further defined as comprising 10% to 25% by weight Abbe number modifier agent relative to either the weight of the first polymer, if $n_1$ is less that $n_2$, or the weight of the second polymer, if $n_2$ is less than $n_1$.

7. The article of claim 1, wherein the Abbe number modifier agent is selected from the group consisting of monomers that are reactive with either precursor monomers of the first polymer, if $n_1$ is less that $n_2$, or precursor molecules of the second polymer, if $n_2$ is less than $n_1$, and nonreactive aromatic compounds.

8. The article of claim 1, wherein the Abbe number modifier agent is selected from the group consisting of chlorobenzhydryl methacrylate, pentachlorophenyl methacrylate, o-chlorostyrene, p-divinylbenzene, N-vinylphthalimide, 2-naphthyl methacrylate, 1naphthylcarbinyl methacrylate, fluoronyl methacrylate, vinylthiophene, 1-naphthyl methacrylate, lead dimethacrylate, vinylnaphthalene and N-vinylcarbazole.

9. The article of claim 1, wherein the Abbe number modifier agent is selected from the group consisting of dibenzofuran, benzalacetophenone, naphthalene, benzalazine, benzoic anhydride and dibenzophenone.

10. The article of claim 1, wherein the Abbe number modifier agent has a refractive index around 1.6.

11. The article of claim 1, wherein $n_1$ is less that $n_2$.

12. The article of claim 1, wherein $n_2$ is less that $n_1$.

13. The article of claim 1, wherein either the first polymer, if $n_1$ is less that $n_2$, or the second polymer, if $n_2$ is less than $n_1$, is poly(alkyl or haloalkyl (meth)acrylate).

14. The article of claim 1, wherein either the first polymer, if $n_2$ is less that $n_1$, or the second polymer, if $n_1$ is less than $n_2$, is polystyrene, a poly(aryl (meth)acrylate) or a poly (halogenated aryl (meth)acrylate).

15. A process for manufacturing an article with radial gradient index comprising:
    (a) mixing an Abbe number modifier agent and precursor monomers of a first polymer having a first refractive index ($n_1$) and a first Abbe number ($\nu_1$), the Abbe number modifier agent being effective to reduce $\nu_1$ by at least 10%;
    (b) obtaining precursor monomers of a second polymer having a second refractive index ($n_2$), wherein $n_2$ is grater than $n_1$, and a second Abbe number ($\nu_2$);
    (c) placing either the mixture or the precursor monomers of the second polymer in a mold;
    (d) partially polymerizing the contents of the mold to obtain a gel;
    (e) diffusing the remaining of either the mixture or the precursor monomers of the second polymer into the gel; and
    (f) completing the polymerization in order to obtain the article with radial index gradient.

16. The process of claim 15, wherein the polymerization is achieved by photopolymerization, and at least the mixture comprises a photopolymerization initiator.

17. The process of claim 15, wherein at least the mixture comprises a crosslinking agent.

18. The process of claim 15, wherein the mixture is placed into the mold and partially polymerized.

19. The process of claim 15, wherein the amount of Abbe number modifier agent composes up to 30% by weight of the mixture.

20. The process of claim 15, wherein the amount of Abbe number modifier agent composes 10 to 25% by weight of the mixture.

21. The process of claim 15, wherein the precursor monomers of the first polymer are selected from the group consisting of alkyl and haloalkyl (meth)acrylates.

22. The process of claim 15, wherein the precursor monomers of the second polymer are selected from the group consisting of styrene, aryl (meth)acrylates and halogenated aryl (meth)acrylates.

23. The process of claim 15, wherein the Abbe number modifier agent has an Abbe number less than or equal to 30.

24. The process of claim 15, wherein the Abbe number modifier agent is selected from the group consisting of chlorobenzhydryl methacrylate, pentachlorophenyl methacrylate, o-chlorostyrene, p-divinylbenzene, N-vinylphthalimide, 2-naphthyl methacrylate, 1-naphthylcarbinyl methacrylate, fluoronyl methacrylate, vinylthiophene, 1-naphthyl methacrylate, lead dimethacrylate, vinylnaphthalene and N-vinylcarbazole.

25. The process of claim 15, wherein the Abbe number modifier agent is selected from the group consisting of dibenzofuran, benazlacetophenone, naphthalene, benzalazine, benzoic anhydride and dibenzophenone.

26. The process of claim 15, wherein the mold is a two-part mold.

* * * * *

UNITED STATES PATENT AND TRADEMARK OFFICE
CERTIFICATE OF CORRECTION

PATENT NO. : 6,229,654 B1  
DATED : May 8, 2001  
INVENTOR(S) : Stéphane Cabeza, Didier Grand-Clement and Yashuhiro Koike Page 1 of 1

It is certified that error appears in the above-identified patent and that said Letters Patent is hereby corrected as shown below:

Column 14, claim 15,
Line 36, please delete "grater" and insert -- greater -- therefor.

Column 13, claims 1, 2, 3, 5, 6, 7, 11, 12,
Lines 27, 32, 35, 40, 44, 49, 66, and 67 respectively, please delete "is less that" and insert -- is less than -- therefor.

Column 14, claims 13 and 14,
Lines 21 and 24 respectively, please delete "is less that" and insert -- is less than -- therefor.

Signed and Sealed this

Fourth Day of December, 2001

Attest:

NICHOLAS P. GODICI
Attesting Officer  Acting Director of the United States Patent and Trademark Office